UNITED STATES PATENT OFFICE.

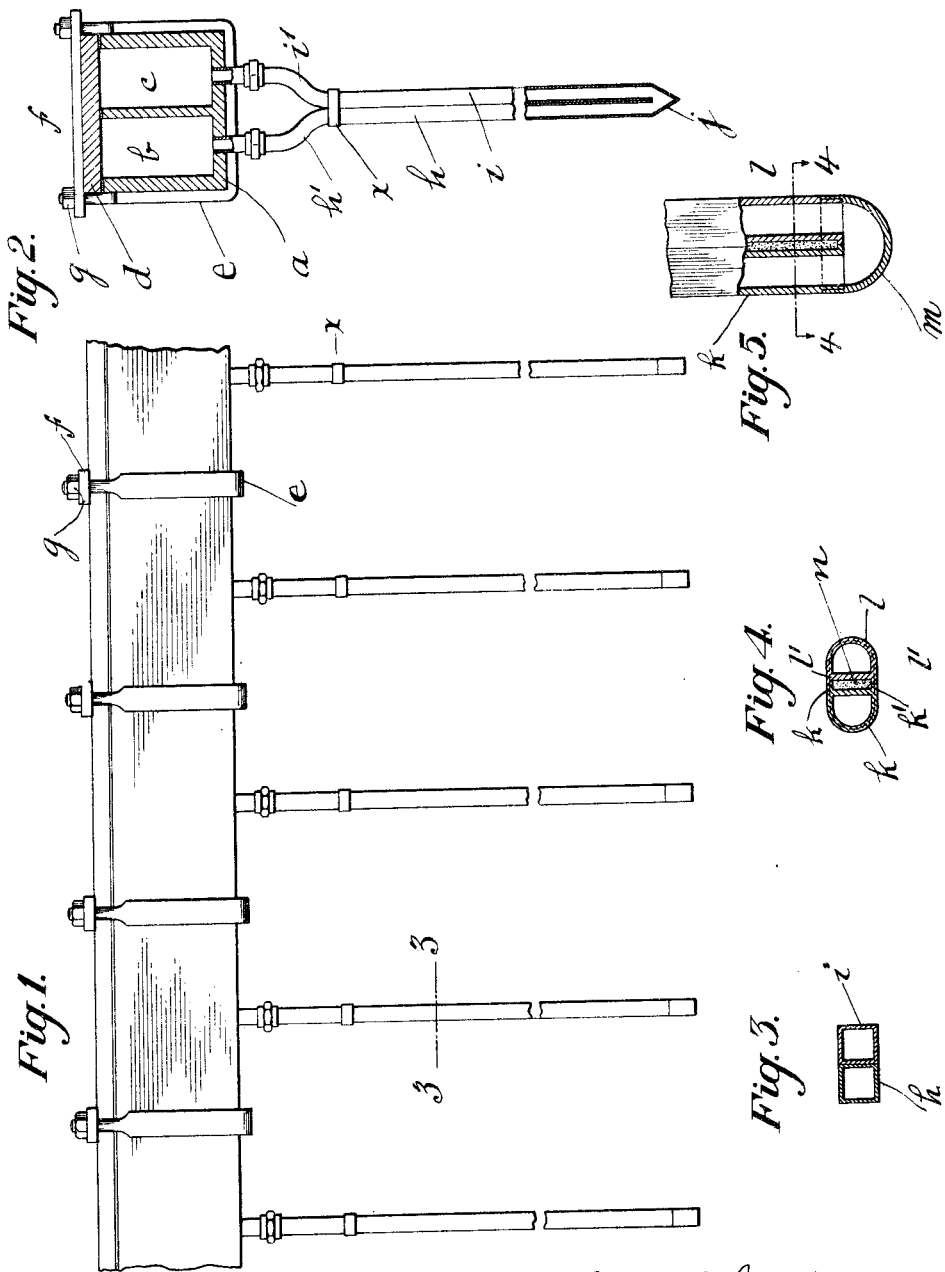

WILLIAM H. LLEWELLYN AND ARTHUR G. OLNEY, OF NEW YORK, N. Y., ASSIGNORS TO THE CENTERFREZE ICE PROCESS COMPANY, OF NEW YORK, N., Y., A CORPORATION OF ARIZONA.

ICE-MAKING APPARATUS.

1,193,569.  Specification of Letters Patent.  Patented Aug. 8, 1916.

Application filed October 9, 1912. Serial No. 724,716.

*To all whom it may concern:*

Be it known that we, WILLIAM H. LLEWELLYN, of the borough of Brooklyn, city and State of New York, and ARTHUR G. OLNEY, of the borough of Manhattan, city, county, and State of New York, citizens of the United States of America, have jointly invented certain Improvements in Ice-Making Apparatus, of which the following is a specification.

This invention relates to the ice forming member of an ice making plant and its purpose is an increase of efficiency.

In the accompanying drawing: Figure 1 is a side elevation: Fig. 2, a transverse section through Fig. 1: Fig. 3, a section on line 3, 3 of Fig. 1: Fig. 4 shows a modification and is a section on line 4, 4 of Fig. 5; and Fig. 5, is a detail sectional view illustrating the modified construction shown in Fig. 4.

$a$ indicates a header having the two longitudinal compartments $b$, $c$, hermetically closed by a cover $d$ clamped in place by a series of U-shaped straps $e$, which each embrace the header, are threaded at their upper ends, pass through a cross plate $f$ lying across the cover and have clamp nuts $g$ applied to their threaded ends. The chamber $b$ may be that into which the refrigerating or freezing medium is admitted and the chamber $c$ that through which it passes out. The freezing parts comprise a plurality of pairs of pipes, $h$, $i$, spaced apart along the header. The pipes of each pair are preferably rectangular in cross section, or at least their adjacent faces are flat, and lie contiguous to or in contact with each other. At their lower ends they communicate and are united at that point by a V-shaped cap or part $j$. These two pipes from their common end to a point adjacent the header may be brazed together or otherwise intimately joined so that a cross section shows, as in Fig. 3, an unbroken outline devoid of projections or depressions that will materially interfere with the withdrawal from the ice cake. Adjacent the header, the pipes diverge at $h'$ and $i'$, the two divergent parts forming a somewhat V-shaped figure and the upper ends of the pipes communicate respectively with the compartments $b$, $c$ of the header. Just below the point of divergence the pipes are held together by a band $x$. When the ice plate is formed, the header with the cake may be hoisted out of the freezing tank and then the freezing members $h$, $i$ are detached from the cake by passing a thawing medium through the header and pipes. With this construction a maximum surface is afforded for absorption of heat from the water to be frozen and experience has shown that the freezing operations in the formation of ice cakes proceed rapidly and economically.

Figs. 4 and 5 show a modification consisting in the use of pipes $k$, $l$ of D-cross section joined at the bottom by a circular or curved cap $m$ which is fitted to the pipes $k$, $l$, (as is the part $j$ to the pipes $h$, $i$) so that all surfaces will be flush and smooth to facilitate withdrawal of the freezing members from the cake.

To minimize absorption of heat from the outgoing freezing medium by the incoming medium the pipes composing each freezing member may be substantially insulated from one another. Thus in Figs. 4 and 5 the D-shaped pipes have flanges $k'$, $l'$ that abut and the space between the flat sides of the pipes is packed with insulating material $n$. When the freezing member is inverted, *i. e.* with the header at the bottom, the ice cake may be released from the freezing parts by a thawing operation and the cake be lifted therefrom. The freezing member is also capable of such use in systems in which the ice cake is frozen at its ends against the walls of the tank.

We claim:

1. A freezing member comprising a header formed with refrigerant inlet and outlet chambers and a plurality of vertically disposed parts spaced apart and each comprising two pipes connected at the outer ends, arranged side by side and joined together so as to form an unbroken exterior outline, the inner ends of said pipes being in communication respectively with the refrigerant inlet and outlet chambers.

2. A freezing member comprising a header formed with refrigerant inlet and outlet chambers and a plurality of vertically disposed parts spaced apart and each comprising two pipes each of which has a flat side the two flat sides of the two pipes being in juxtaposition, a cap connecting the outer ends of the pipes and means for connecting their respective inner ends with inlet and outlet chambers in the header, the pipes and cap being so arranged that said part will readily draw from the ice cake.

3. A freezing member comprising a header formed with refrigerant inlet and outlet chambers and a plurality of vertically disposed parts spaced apart and each comprising two pipes connected at the outer ends, arranged side by side and joined together so as to form an unbroken exterior outline, the inner ends of said pipes being in communication respectively with the refrigerant inlet and outlet chambers and insulating means interposed between the contiguous faces of pipes of the same part.

In testimony whereof, we have hereunto subscribed our names.

WILLIAM H. LLEWELLYN.
ARTHUR G. OLNEY.

Witnesses:
MABLE SHAW,
L. F. BROWNING.

Copies of this patent may be obtained for five cents each, by addressing the "Commissioner of Patents, Washington, D. C."